(12) United States Patent
Winter

(10) Patent No.: US 8,480,350 B2
(45) Date of Patent: Jul. 9, 2013

(54) TURBOFAN ENGINE WITH VARIABLE BYPASS NOZZLE EXIT AREA AND METHOD OF OPERATION

(75) Inventor: Michael Winter, New Haven, CT (US)

(73) Assignee: United Technologies Corporation, Hartford, CT (US)

( * ) Notice: Subject to any disclaimer, the term of this patent is extended or adjusted under 35 U.S.C. 154(b) by 963 days.

(21) Appl. No.: 12/442,137

(22) PCT Filed: Oct. 12, 2006

(86) PCT No.: PCT/US2006/039993
§ 371 (c)(1),
(2), (4) Date: Mar. 20, 2009

(87) PCT Pub. No.: WO2008/045074
PCT Pub. Date: Apr. 17, 2008

(65) Prior Publication Data
US 2010/0068039 A1    Mar. 18, 2010

(51) Int. Cl.
*F01B 25/06* (2006.01)
(52) U.S. Cl.
USPC .................................................. 415/1
(58) Field of Classification Search
USPC ........ 415/1, 144, 331, 117, 143, 914; 60/204, 60/206, 267, 262, 39.17, 226.1, 226.2; 239/265.17
See application file for complete search history.

(56) References Cited

U.S. PATENT DOCUMENTS

| | | | |
|---|---|---|---|
| 2,355,434 A * | 8/1944 | Harter | 137/625.63 |
| 2,703,477 A | 3/1955 | Anxionnaz | |
| 2,763,984 A | 9/1956 | Kadosch et al. | |
| 3,000,177 A | 9/1961 | Logerot et al. | |
| 3,000,178 A | 9/1961 | Logerot | |
| 3,288,373 A | 11/1966 | Pike | |

(Continued)

FOREIGN PATENT DOCUMENTS

| | | |
|---|---|---|
| DE | 10 2004 024016 | 12/2005 |
| FR | 923 996 A | 7/1947 |

(Continued)

OTHER PUBLICATIONS

European Search Report for EP Application No. 11186123.3, Apr. 11, 2012.

(Continued)

*Primary Examiner* — Alexander Gilman
(74) *Attorney, Agent, or Firm* — Carlson, Gaskey & Olds, P.C.

(57) ABSTRACT

A turbofan engine includes core and fan nacelles that provide a bypass flow path having a nozzle exit area. The bypass flow path carries a bypass flow to be expelled from the nozzle exit area. A turbofan is arranged within the fan nacelle and upstream from the core nacelle for generating the bypass flow. A flow control device includes a surface in the bypass flow path including an aperture. The flow device is adapted to introduce a fluid into the bypass flow path for altering a boundary layer of the bypass flow that effectively changes the nozzle exit area. In one example, bleed air is introduced through the aperture. In another example, pulses of fluid from a Helmholz resonator flow through the aperture. By decreasing the boundary layer, the nozzle exit area is effectively increased. By increasing the boundary layer, the nozzle exit area is effectively decreased.

12 Claims, 2 Drawing Sheets

U.S. PATENT DOCUMENTS

| | | | |
|---|---|---|---|
| 3,420,060 A | | 1/1969 | Ostroff et al. |
| 3,641,766 A | | 2/1972 | Uehling |
| 3,688,504 A | | 9/1972 | Hutchinson et al. |
| 3,729,934 A | | 5/1973 | Denning et al. |
| 4,776,163 A | * | 10/1988 | Brockmann .................... 60/792 |
| 4,804,316 A | * | 2/1989 | Fleury ........................... 417/407 |
| 4,973,223 A | * | 11/1990 | Franklin ....................... 415/157 |
| 5,269,135 A | | 12/1993 | Vermejan et al. |
| 5,568,724 A | | 10/1996 | Lindner et al. |
| 5,713,204 A | * | 2/1998 | Kadlicko ........................ 60/608 |
| 5,806,303 A | | 9/1998 | Johnson |
| 5,896,890 A | * | 4/1999 | Bourkel et al. .......... 137/625.63 |
| 6,105,616 A | * | 8/2000 | Sturman et al. .......... 137/625.65 |
| 6,179,251 B1 | | 1/2001 | Tindell et al. |
| 6,203,272 B1 | * | 3/2001 | Walsham ...................... 415/158 |
| 6,269,642 B1 | * | 8/2001 | Arnold et al. .................. 60/602 |
| 6,308,740 B1 | | 10/2001 | Smith et al. |
| 6,308,898 B1 | * | 10/2001 | Dorris et al. ............. 239/265.17 |
| 6,334,753 B1 | | 1/2002 | Tillman et al. |
| 6,390,418 B1 | | 5/2002 | McCormick et al. |
| 6,679,057 B2 | * | 1/2004 | Arnold ............................. 60/602 |
| 6,776,574 B1 | * | 8/2004 | Parker ........................... 415/158 |
| 7,021,042 B2 | * | 4/2006 | Law .............................. 60/226.1 |
| 7,237,378 B2 | * | 7/2007 | Lardellier .................... 60/226.1 |
| 7,377,100 B2 | * | 5/2008 | Bruno et al. .................... 60/267 |
| 7,422,033 B2 | * | 9/2008 | Barber ...................... 137/625.64 |
| 7,837,155 B2 | * | 11/2010 | Meister et al. ................. 244/209 |
| 7,950,218 B2 | * | 5/2011 | Beutin et al. .................... 60/231 |
| 2003/0145577 A1 | | 8/2003 | Hunter et al. |
| 2005/0022866 A1 | | 2/2005 | Sakurai et al. |
| 2005/0060983 A1 | * | 3/2005 | Lardellier .................... 60/226.1 |
| 2005/0081530 A1 | | 4/2005 | Bagnall et al. |
| 2006/0022092 A1 | | 2/2006 | Miller et al. |
| 2007/0266707 A1 | * | 11/2007 | Meister et al. ............... 60/605.1 |
| 2008/0112799 A1 | | 5/2008 | Winter et al. |
| 2010/0024415 A1 | * | 2/2010 | Nishiyama et al. ............. 60/602 |
| 2012/0234017 A1 | * | 9/2012 | Staubach et al. ................ 60/792 |

FOREIGN PATENT DOCUMENTS

| | | |
|---|---|---|
| FR | 2 088 303 | 1/1972 |
| GB | 704 669 A | 2/1954 |
| GB | 795 651 | 5/1958 |
| GB | 795 652 | 5/1958 |
| GB | 1 190 364 A | 5/1970 |
| GB | 1 352 206 | 5/1974 |
| GB | 2 014 663 | 8/1979 |
| GB | 2 110 762 | 6/1983 |
| GB | 2 379 483 | 3/2003 |
| GB | 2 407 142 | 4/2005 |
| WO | 2008/045051 | 4/2008 |

OTHER PUBLICATIONS

International Search Report for PCT Application No. PCT/US2006/039993, Jul. 11, 2007.

* cited by examiner

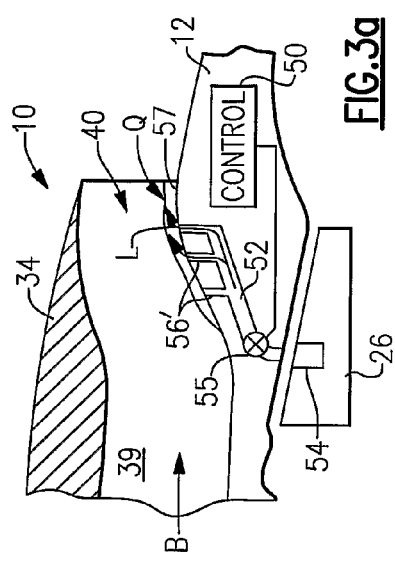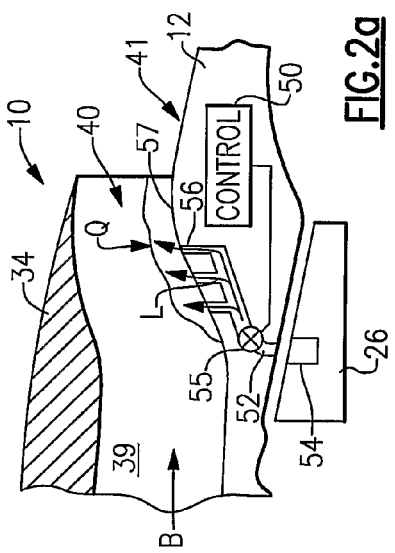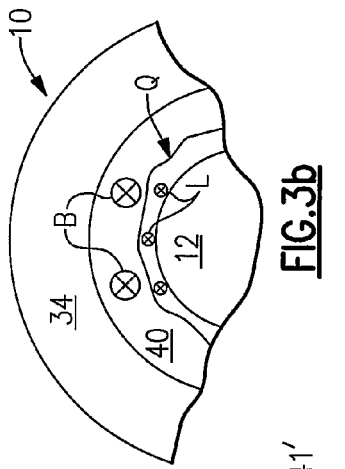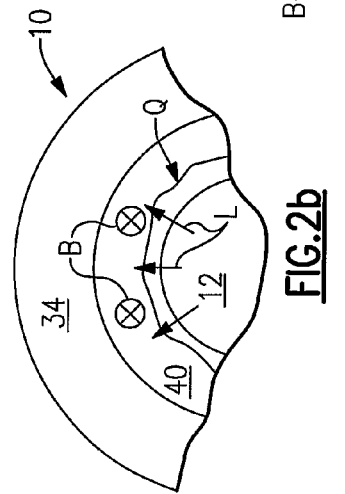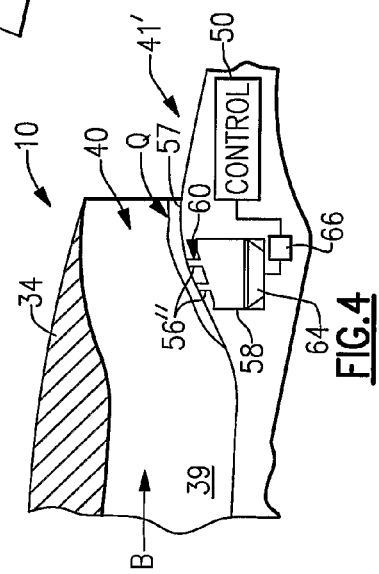

TURBOFAN ENGINE WITH VARIABLE BYPASS NOZZLE EXIT AREA AND METHOD OF OPERATION

This application claims priority to PCT Application Serial No. PCT/US2006/039993, filed on Oct. 12, 2006.

BACKGROUND OF THE INVENTION

This invention relates to a turbofan engine, and more particularly, the invention relates to effectively changing a nozzle exit area of a bypass flow path.

A typical turbofan engine includes a spool supporting a compressor and a turbine. The spool, compressor and turbine are housed within a core nacelle. A turbofan, or "fan," is coupled to the spool and is arranged upstream from the core nacelle. A fan nacelle surrounds the turbofan and core nacelle. The fan and core nacelles provide a bypass flow path having a nozzle exit area through which bypass flow from the fan exits the engine.

Turbofan engines typical have a fixed nozzle exit area. The flow through the nozzle affects, for example, the operational line of the fan and compressor and the overall performance and efficiency of the engine. Since the nozzle exit area is fixed, the operational lines and other engine operating characteristics must be managed using a more limited number of engine parameters. The engine parameters are varied during engine operation to obtain desired engine operating characteristics, such as fuel efficiency. What is needed is a method and apparatus of managing engine operating characteristics by using the nozzle exit area as an additional variable parameter. What is also needs is an ability to use the nozzle exit area as a variable parameter with minimal cost and weight penalties.

SUMMARY OF THE INVENTION

A turbofan engine includes core and fan nacelles that provide a bypass flow path having a nozzle exit area. In one example, the nozzle exit area is fixed providing a physically constant size. The bypass flow path carries a bypass flow circumventing the core nacelle and expelled from the nozzle exit area. A turbofan is arranged within the fan nacelle and upstream from the core nacelle for generating the bypass flow. A flow control device includes a surface in the bypass flow path including an aperture. The flow device is adapted to introduce a fluid into the bypass flow path for altering a boundary layer of the bypass flow that effectively changes the nozzle exit area. In one example, bleed air is introduced through the aperture. In another example, pulses of fluid from a Helmholz resonator flow through the aperture. By decreasing the boundary layer, the nozzle exit area is effectively increased. By increasing the boundary layer, the nozzle exit area is effectively decreased.

These and other features of the present invention can be best understood from the following specification and drawings, the following of which is a brief description.

BRIEF DESCRIPTION OF THE DRAWINGS

FIG. 2a is a schematic partial side cross-sectional view of a turbofan engine with an example flow control device expelling fluid in a first manner.

FIG. 2b is a schematic partial end view of the turbofan engine shown in FIG. 2a.

FIG. 3a is a schematic partial side cross-sectional view of a turbofan engine with the example flow control device expelling fluid in a second manner.

FIG. 3b is a schematic partial end view of the turbofan engine shown in FIG. 3a.

FIG. 4 is a schematic partial side cross-sectional view of the turbofan engine with another example flow control device.

DETAILED DESCRIPTION OF THE PREFERRED EMBODIMENT

Figure 1:
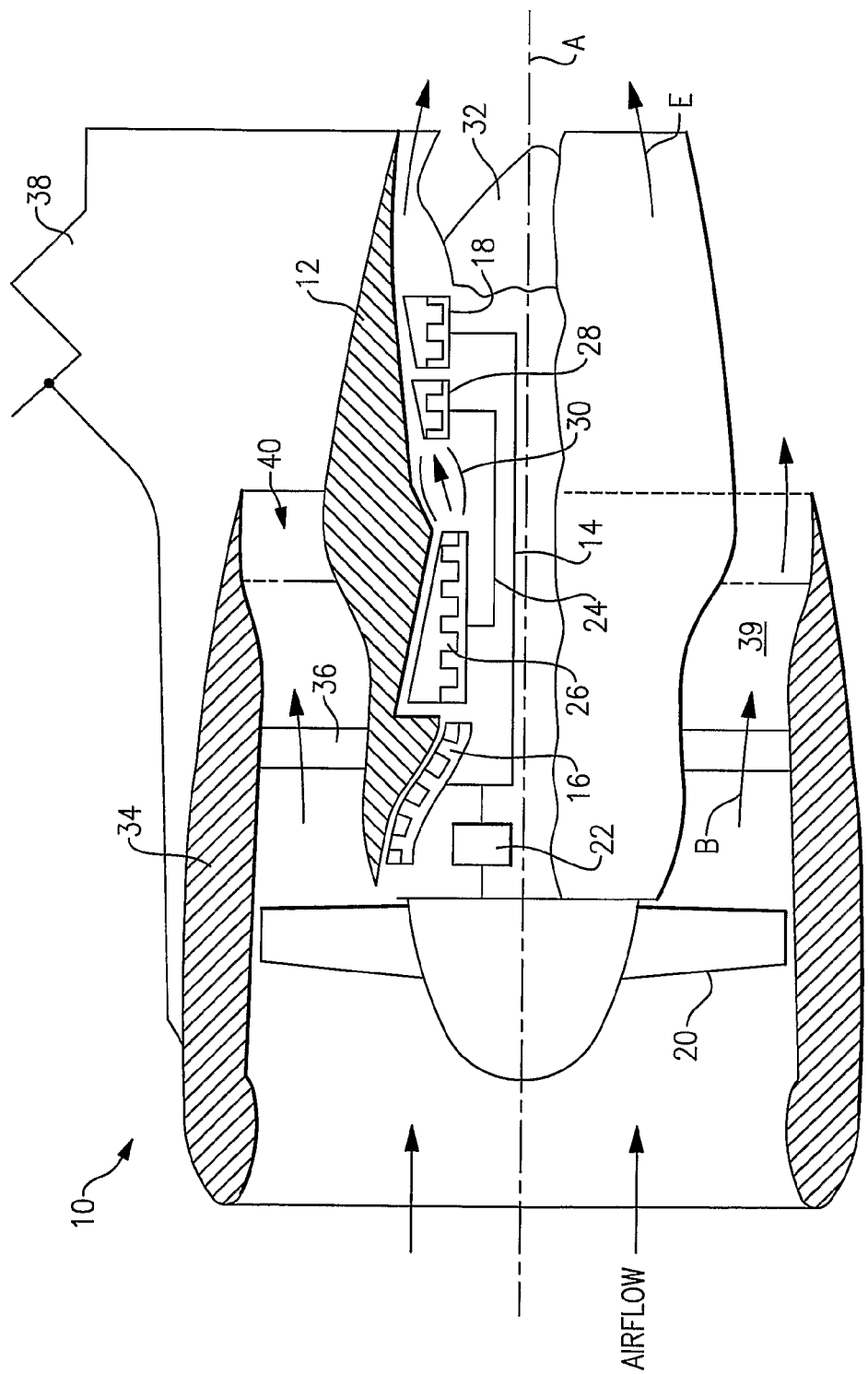
FIG. 1 is a cross-sectional view of an example turbofan engine.

A geared turbofan engine 10 is shown in FIG. 1. A pylon 38 secures the engine 10 to an aircraft. The engine 10 includes a core nacelle 12 that houses a low spool 14 and high spool 24 rotatable about an axis A. The low spool 14 supports a low pressure compressor 16 and low pressure turbine 18. In the example, the low spool 14 drives a turbofan 20 through a gear train 22. The high spool 24 supports a high pressure compressor 26 and high pressure turbine 28. A combustor 30 is arranged between the high pressure compressor 26 and high pressure turbine 28. Compressed air from compressors 16, 26 mixes with fuel from the combustor 30 and is expanded in turbines 18, 28.

In the examples shown, the engine 10:1 is a high bypass turbofan arrangement. In one example, the bypass ratio is greater than 10, and the turbofan diameter is substantially larger than the diameter of the low pressure compressor 16. The low pressure turbine 18 has a pressure ratio that is greater than 5:1, in one example. The gear train 22 is an epicycle gear train, for example, a star gear train, providing a gear reduction ratio of greater than 2.5:1. It should be understood, however, that the above parameters are only exemplary of a contemplated geared turbofan engine. That is, the invention is applicable to other engines including direct drive turbofans.

Airflow enters a fan nacelle 34, which surrounds the core nacelle 12 and turbofan 20. The turbofan 20 directs air into the core nacelle 12, which is used to drive the turbines 18, 28, as is known in the art. Turbine exhaust E exits the core nacelle 12 once it has been expanded in the turbines 18, 28, in a passage provided between the core nacelle and a tail cone 32.

The core nacelle 12 is supported within the fan nacelle 34 by structure 36, which are commonly referred to as upper and lower bifurcations. A generally annular bypass flow path 39 is arranged between the core and fan nacelles 12, 34. The example illustrated in FIG. 1 depicts a high bypass flow arrangement in which approximately eighty percent of the airflow entering the fan nacelle 34 bypasses the core nacelle 12. The bypass flow B within the bypass flow path 39 exits the fan nacelle 34 through a nozzle exit area 40.

For the engine 10 shown in FIG. 1, a significant amount of thrust may be provided by the bypass flow B due to the high bypass ratio. Thrust is a function of density, velocity and area. One or more of these parameters can be manipulated to vary the amount and direction of thrust provided by the bypass flow B. In one example, the engine 10 includes a structure associated with the nozzle exit area 40 to change the physical area and geometry to manipulate the thrust provided by the bypass flow B. However, it should be understood that the nozzle exit area may be effectively altered by other than structural changes, for example, by altering the boundary layer, which changes the flow velocity. Furthermore, it should be understood that any device used to effectively change the nozzle exit area is not limited to physical locations near the exit of the fan nacelle 34, but rather, includes altering the bypass flow B at any suitable location.

The engine 10 has a flow control device 41 that is used to effectively change the nozzle exit area. In one example, the flow control device 41 provides the fan nozzle exit area 40 for discharging axially the bypass flow B pressurized by the upstream turbofan 20 of the engine 10. A significant amount of thrust is provided by the bypass flow B due to the high bypass ratio. The turbofan 20 of the engine 10 is designed for a particular flight condition, typically cruise at 0.8 M and 35,000 feet. The turbofan 20 is designed at a particular fixed stagger angle for an efficient cruise condition. The flow control device 41 is operated to vary the nozzle exit area 40 to adjust fan bypass air flow such that the angle of attack or incidence on the fan blade is maintained close to design incidence at other flight conditions, such as landing and take-off. This enables desired engine operation over a range of flight condition with respect to performance and other operational parameters such as noise levels. In one example, the flow control device 41 defines a nominal converged position for the nozzle exit area 40 at cruise and climb conditions, and radially opens relative thereto to define a diverged position for other flight conditions. The flow control device 41 provides an approximately 20% change in the exit nozzle area 40.

Referring to FIGS. 2a-4, a flow control device is shown that uses a fluid, such as air, to vary a boundary layer Q within the bypass flow path 39 to effectively change the nozzle exit area 40. The boundary layer Q is created by the bypass flow B along the walls of the bypass flow path 39.

In the examples shown in FIGS. 2a-3b, the flow control device 41 uses bleed air L from one of the compressor stages 54. The bleed air L is introduced to the bypass flow path 39 in a desired manner to affect the boundary layer Q. It is typically desirable to extract bleed air L from the lowest usable compressor stage to minimize the efficiency impact on the engine. In one example, the compressor stage 54 corresponds to an upstream compressor stage on the high compressor 26. In one example, extraction of bleed air L is avoided during particular engine operating conditions, such as cruise.

In one example, a controller 50 commands a valve 55 arranged in a passage 52. The passage 52 fluidly connects the compressor stage 54 to apertures 56 arranged on a surface 57 adjacent to the bypass flow path 39. Three apertures 56 are shown for exemplary purposes. The apertures 56 can be arranged in an array and plumbed in any suitable manner. The valve 55 selectively regulates the bleed air L provided through the apertures 56 in response to commands from the controller 50 to obtain a desired boundary layer thickness. The controller 50 determines when changes in the effective nozzle exit area 40 are desired for a particular engine operating characteristic.

Decreasing the boundary layer at the surface 57 effectively "opens" the nozzle exit area 40. A decrease in boundary layer Q increases the mean velocity of bypass flow B across the nozzle exit area 40. Conversely, decreasing the boundary layer Q at the surface 57 effectively "closes" the nozzle exit area 40. An increase in boundary layer decreases the mean velocity of bypass flow B across the nozzle exit area 40.

In the example shown in FIGS. 2a-2b, the apertures 56 introduce the bleed air L in a direction generally perpendicular to the bypass flow B, which effectively increases the boundary layer Q and provides and effective closing of the nozzle exit area 40. The bypass flow B in FIGS. 2b and 3b are indicated in a generally axial direction.

In the example shown in FIGS. 3a-3b, the apertures 56' are arranged generally tangentially to the bypass flow B so that introducing the bleed air L effectively opens the nozzle exit area 40 by decreasing the boundary layer.

In either approach shown in FIGS. 2a-2b and FIGS. 3a-3b, the bleed air L provides a range of effective nozzle exit areas 40 between no-bleed flow and bleed flow conditions. Said another way, in one example, one of the aperture orientations shown in the Figures is chosen. With the chosen aperture configuration, the flow of bleed air L is adjusted to obtain the desired boundary layer Q. In this manner, the flow control device 41 provides another engine parameter by which the engine operating characteristics can be managed.

Another example flow control device 41' is shown in FIG. 4. In one example, the flow control device 41' uses a chamber 58 to provide pulsed flow to the surface 57 through passages 60 to the apertures 56. In one example, the chamber 58 is tuned to provide air to the bypass flow path 39 at a desired frequency. An exciter 64 is actuated by a driver 66 in response to a command from the controller 50. The exciter 64 create pulses that are delivered to through the apertures 56 to change the boundary layer Q. The driver 66 modulates the exciter 64 at a desired frequency to obtain a desired boundary layer Q. The aperture 56 and chamber 58 geometry are selected to achieve the desired boundary layer Q. The apertures 56 can be arranged in any suitable manner, for example in the manner described above relative to FIGS. 2a-3b.

Although an example embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbofan engine comprising:
    core and fan nacelles providing a bypass flow path having a nozzle exit area, the bypass flow path for carrying a bypass flow to be expelled from the nozzle exit area;
    a turbofan arranged within the fan nacelle and upstream from the core nacelle for generating the bypass flow;
    a spool having a turbine mounted thereon and housed within the core nacelle;
    a gear train interconnecting the turbofan and the spool, the turbofan coupled to the spool through the gear train;
    a flow control device including a surface in the bypass flow path including an aperture, the flow device adapted to introduce a fluid into the bypass flow path through the aperture for altering a boundary layer of the bypass flow that effectively changes the nozzle exit area; and
    a controller in communication with the flow control device, the controller configured to determine when chan es in the effective nozzle exit area are desired and command the flow control device to obtain a desired boundary layer.

2. The turbofan engine according to claim 1, comprising a flow source for providing the fluid.

3. The turbofan engine according to claim 2, comprising a compressor arranged within the core nacelle, the compressor providing bleed air as the fluid.

4. The turbofan engine according to claim 3, comprising a low spool and a high spool rotatable relative to one another and housed within the core nacelle, the compressor mounted on the high spool, and the turbofan coupled to the low spool through the gear train.

5. The turbofan engine according to claim 1, wherein the flow control device includes a controller programmed to command a valve for regulating a flow of the fluid through the aperture, wherein the valve is closed during a cruise condition.

6. The turbofan engine according to claim 1, wherein the aperture is arranged to introduce the fluid generally perpendicularly to the bypass flow for increasing the boundary layer.

7. The turbofan engine according to claim 1, wherein the bypass flow path extends axially along a radial space arranged between the core and fan nacelles.

8. A turbofan engine comprising:
   core and fan nacelles providing a bypass flow path having a nozzle exit area, the bypass flow path for carrying a bypass flow to be expelled from the nozzle exit area;
   a turbofan arranged within the fan nacelle and upstream from the core nacelle for generating the bypass flow;
   a flow control device including a surface in the bypass flow path including an aperture, the flow device adapted to introduce a fluid into the bypass flow path through the aperture for altering a boundary layer of the bypass flow that effectively changes the nozzle exit area, wherein the aperture is arranged to introduce the fluid generally in the same direction as the bypass flow for decreasing the boundary layer;
   a controller in communication with the flow control device, the controller configured to determine when changes in the effective nozzle exit area are desired and command the flow control device to obtain a desired boundary layer; and
   a compressor arranged within the core nacelle, the compressor providing bleed air as the fluid.

9. The turbofan engine according to claim 8, wherein the bypass flow path extends axially along a radial space arranged between the core and fan nacelles.

10. A method of controlling a turbofan engine comprising the steps of:
    determining when changes in the effective nozzle exit area of a turbofan bypass flow path are desired;
    commanding a flow control device to obtain a desired boundary layer by introducing a compressor bleed air into a turbofan bypass flow path to alter a bypass flow through the bypass flow path; and
    effectively changing a nozzle exit area of the bypass flow path with the altered bypass flow, including decreasing a boundary layer along a surface within the bypass flow path thereby obtaining the desired boundary layer.

11. The method according to claim 10, wherein the step of effectively changing the nozzle exit area includes increasing a boundary layer along a surface within the bypass flow path.

12. The method according to claim 10, wherein the bypass flow path extends axially along a radial space arranged between a core nacelle and a fan nacelle.

* * * * *

UNITED STATES PATENT AND TRADEMARK OFFICE
CERTIFICATE OF CORRECTION

PATENT NO. : 8,480,350 B2  Page 1 of 1
APPLICATION NO. : 12/442137
DATED : July 9, 2013
INVENTOR(S) : Winter It is certified that error appears in the above-identified patent and that said Letters Patent is hereby corrected as shown below:

In the Claims:

Claim 1, Column 4, Line 49, change "chan es" to --changes--.

Signed and Sealed this
Seventeenth Day of December, 2013

Margaret A. Focarino
*Commissioner for Patents of the United States Patent and Trademark Office*